United States Patent [19]

Molina

[11] Patent Number: 4,594,040
[45] Date of Patent: Jun. 10, 1986

[54] PANEL FASTENER

[75] Inventor: Jorge W. Molina, Torrance, Calif.

[73] Assignee: Deutsch Fastener Corp., El Segundo, Calif.

[21] Appl. No.: 728,478

[22] Filed: Apr. 29, 1985

Related U.S. Application Data

[62] Division of Ser. No. 527,229, Aug. 29, 1983.

[51] Int. Cl.⁴ .............................................. F16B 21/18
[52] U.S. Cl. .................... 411/353; 10/86 B; 411/517
[58] Field of Search .............. 411/353, 517, 518, 519, 411/522, 539; 10/86 R, 86 B

[56] References Cited

U.S. PATENT DOCUMENTS

| 1,758,515 | 5/1930 | Heiermann | 411/517 X |
| 2,742,072 | 4/1956 | Murphy | 151/9 |
| 3,093,179 | 6/1963 | Zahodiakin | 411/353 |
| 3,180,388 | 4/1965 | Newcomer et al. | 411/353 |
| 3,192,980 | 7/1965 | Sauter | 151/41.5 |
| 3,289,726 | 12/1966 | Sauter . | |
| 3,730,243 | 5/1973 | Smith | 151/41.5 |
| 3,765,465 | 10/1973 | Gullistan | 411/353 |
| 4,006,659 | 2/1977 | Wurzel et al. | 411/518 |
| 4,183,280 | 1/1980 | Hashimoto | 411/518 |
| 4,285,380 | 8/1981 | Guilstan | 411/103 |
| 4,324,517 | 4/1982 | Dey | 411/353 |
| 4,343,581 | 8/1982 | Millheiser | 411/353 X |
| 4,432,680 | 2/1984 | Molina | 411/316 X |

FOREIGN PATENT DOCUMENTS 51058 9/1941 Netherlands ......................... 411/518

Primary Examiner—Thomas J. Holko
Attorney, Agent, or Firm—Gausewitz, Carr & Rothenberg

[57] ABSTRACT

This invention provides a captive fastener in which a nut is held to a workpiece by a retainer ring held in a two-piece grommet attached to the workpiece, the retainer ring being flat and split, with its grain perpendicular to a diameter bisecting the split, and its inner and outer edges having alternate elongated recesses to increase the effective ring width without increasing spring force. The stud assembly includes a cage secured to the other workpiece, with side flanges removably and floatingly retaining a housing in which is a stud and spring biased ratchet washer. The notched outer end of the housing is bent over the head of the stud to secure the stud. The ratchet washer has tabs fitting in the housing wall, and ratchet teeth to engage teeth on the end of the nut. A cover fits over the housing.

5 Claims, 7 Drawing Figures

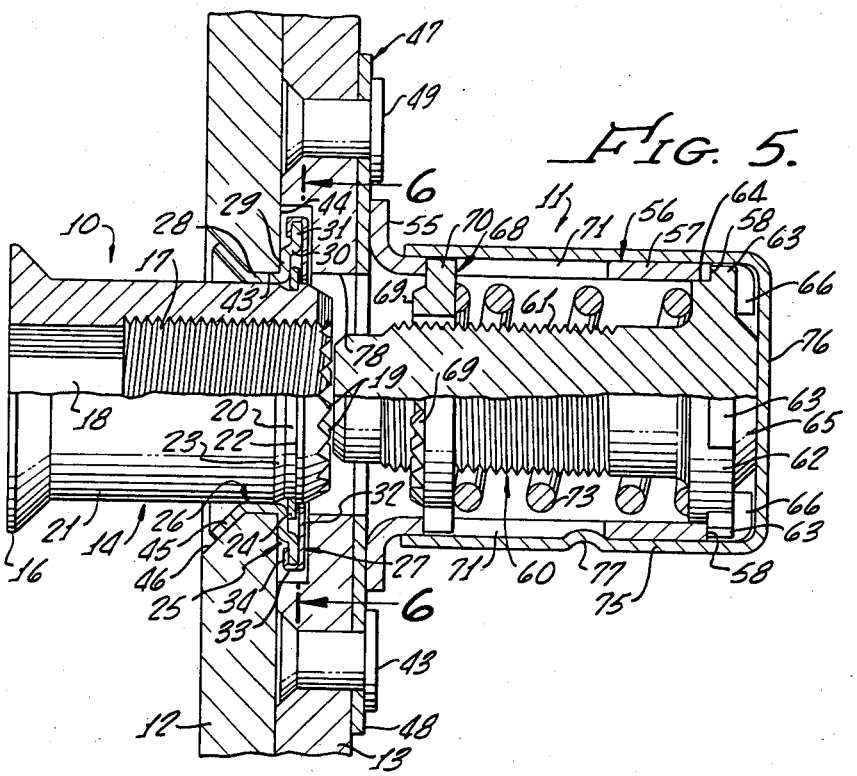
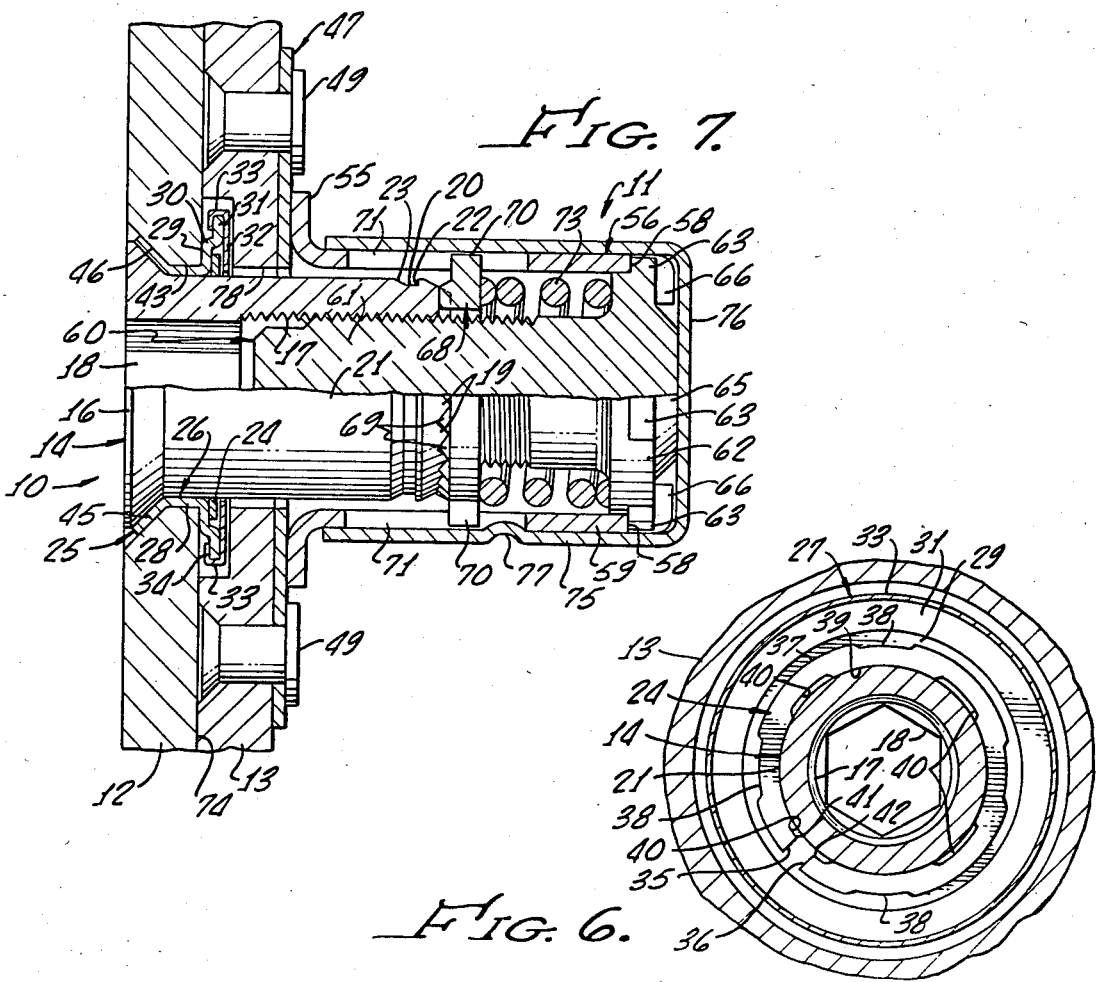

PANEL FASTENER

This is a division of application Ser. No. 527,229, filed Aug. 29, 1983, for PANEL FASTENER.

BACKGROUND OF THE INVENTION

The stressed panel fastener of U.S. Pat. No. 3,192,980 has proved very successful for uses such as the retention of the panels of aircraft. This is a self-locking captive fastener that provides good resistance to shear loads. However, this fastener suffers from the drawback of being relatively complex and of expensive machined construction. It is also more bulky and heavier than desired. The nut of the fastener of the aforementioned patent is held to one workpiece by a split annular resilient ring that bears against the cylindrical surface of the nut and can enter a groove near the outer end of the nut when the nut is loosened. In the latter position, the ring prevents withdrawal of the nut from the opening in the workpiece. However, such an exposed retainer ring is relatively easily dislodged from the nut so that its function is lost. Even more serious, the loose retainer ring can cause considerable damage such as, for example, when falling into the intake of a jet engine.

In the designs of U.S. Pat. Nos. 3,289,726 and 3,765,465, grommets were added to receive the outer portions of the retainer ring. However, the problems were not fully solved because the rings remained vulnerable to being dislodged and coming loose. In U.S. Pat. No. 3,289,726 the grommet is exposed on one side of the panel when the fastener is separated. In U.S. Pat. No. 3,765,465 the grommet is secured to the panel, but the retainer ring is positioned within the opening in the panel so that the diameter of the opening must be relatively large. Increasing the dimension of the ring, in width or thickness, in an effort to improve its retention, has the disadvantage of increasing the inward spring force. This makes it difficult to advance the nut and results in excessive wear on the cadmium plating or other protective coating on the nut. Therefore, prior designs have represented a compromise rather than being fully staisfactory in all respects.

SUMMARY OF THE INVENTION

The present invention provides an improvement in a captive stressed panel fastener, overcoming the difficulties of the prior art and resulting in additional advantages. The fastener is adapted to be made largely of sheet metal, being much more economically fabricated and assembled than prior designs. It is also smaller and of lighter weight than comparable fasteners of earlier designs.

In the present invention, the fastener includes a nut assembly and a stud assembly, the latter being held to the workpiece by means of a slotted cage which permits the nut assembly to be removed and to be replaced by merely deflecting the flanges of the cage rather than the more complicated procedure of taking out rivets, as in the design of aforementioned U.S. Pat. No. 3,192,980. The stud assembly includes a housing held to the cage by means of tabs which permit limited relative floating movement of the housing with respect to the cage and hence to the workpiece. Thus, it is the housing that floats in the present design, rather than the internal components as in the earlier patented construction. The housing has a slotted end part which is bent over the slotted periphery of the head of the stud which securely holds the stud to the housing, preventing relative movement of these parts. A ratchet washer circumscribes the shank of the stud, having diametrically opposite tabs which extend outwardly into slots in the housing which hold the ratchet washer against rotational movement while permitting it to move axially a limited distance. The ratchet washer is biased toward the open end of the housing by a compression spring. A cover over the housing is held in place by a dimple that projects into one of the slots for the ratchet washer.

The nut assembly is held to the other workpiece by means of a grommet which holds a retainer ring. The grommet is of two-piece construction with one part being bent over the base of the other to define an annular recess within which the retainer ring is placed. The second part of the grommet has a straight tubular portion which is flared outwardly to form a flange used in holding the grommet to the workpiece. The grommet positions the retainer ring adjacent one end of the opening in the workpiece, rather than within the opening as in U.S. Pat. No. 3,765,465, so that the opening in the workpiece may be made of smaller diameter. The retainer ring is of sheet metal and split, biased inwardly around the cylindrical portion of the nut to enter a retention groove at the end of the nut when the nut is loosened. It is important that the grain of the retention washer be oriented so that it is in a direction perpendicular to a diameter that bisects the space between the ends of the washer at the split. This allows the retention washer to expand radially with minimal distortion. The inner and outer circumferential edges of the washer are provided with spaced recesses, those in the inner edge being intermediate those of the outer edge. The ends of the washer at the split are at one of the inner recesses so that the inner corners of the ends are recessed within the grommet and do not engage the nut. This permits expansion of the washer as it rides along the tubular part of the nut with less distortion than in the conventional design. The inner recesses result in less surface contact with the nut, reducing friction and damage to the nut such as from scraping off the protective cadmium plating. The recessed inner and outer surfaces result in a greater effective width of the retention washer with no increase in spring force. This means that the washer can be much more securely held because there is a larger effective width of the washer within the recess in the grommet. The retention washer also can be made thicker than before to give it greater stability without a greater spring force.

BRIEF DESCRIPTION OF THE DRAWINGS

FIG. 5 is a longitudinal sectional view of the fastener attached to the parts to be secured and the fastener loosened;

FIG. 6 is a transverse sectional view taken line 6—6 of FIG. 5; and

FIG. 7 is a longitudinal sectional view similar to that of FIG. 5, but with the fastener in the mated condition.

DETAILED DESCRIPTION OF THE INVENTION

Figure 1:
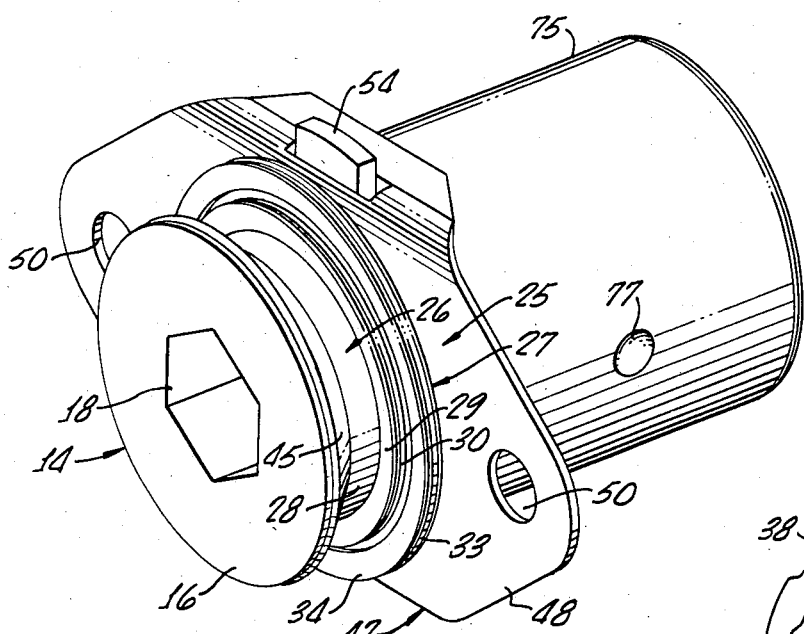
FIG. 1 is a perspective view of the fastener of this invention in the secured position, with the parts connected by the fastener removed for clarity.

The fastener includes a nut assembly 10 and stud assembly 11 that are used to attach together members 12 and 13, respectively, such as an aircraft panel and supporting structure.

The nut assembly includes a nut 14, which has a head 16 at one end and a threaded opening 17 extending inwardly from the opposite end. The head 16 has a frustoconical undersurface for flush installation and a driving socket 18 extends into that end of the nut. On the opposite end, around the entrance to the threaded opening 17, are radially arranged ratchet teeth 19. Inwardly of the teeth 19, and adjacent that end of the nut, is an annular groove 20 in the cylindrical wall 21 of the nut. The groove has a radial outer end wall 22 and a tapered inner wall 23 that inclines away from the base of the groove and the end of the nut. This groove 20, when the fastener is in the separated position of FIG. 5, can receive the inner part of a resilient retainer ring 24.

Figure 2:
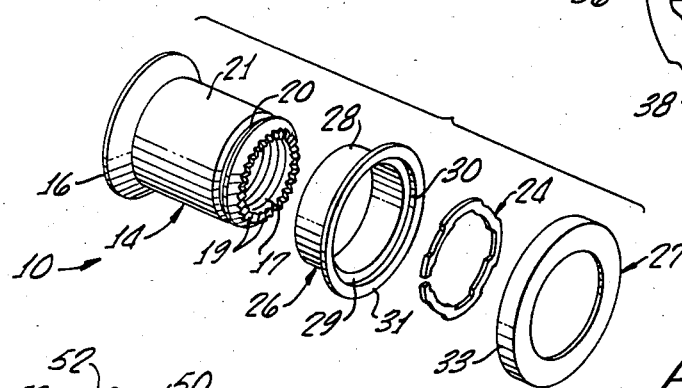
FIG. 2 is an exploded perspective view of the nut portion of the fastener.
Figure 3:
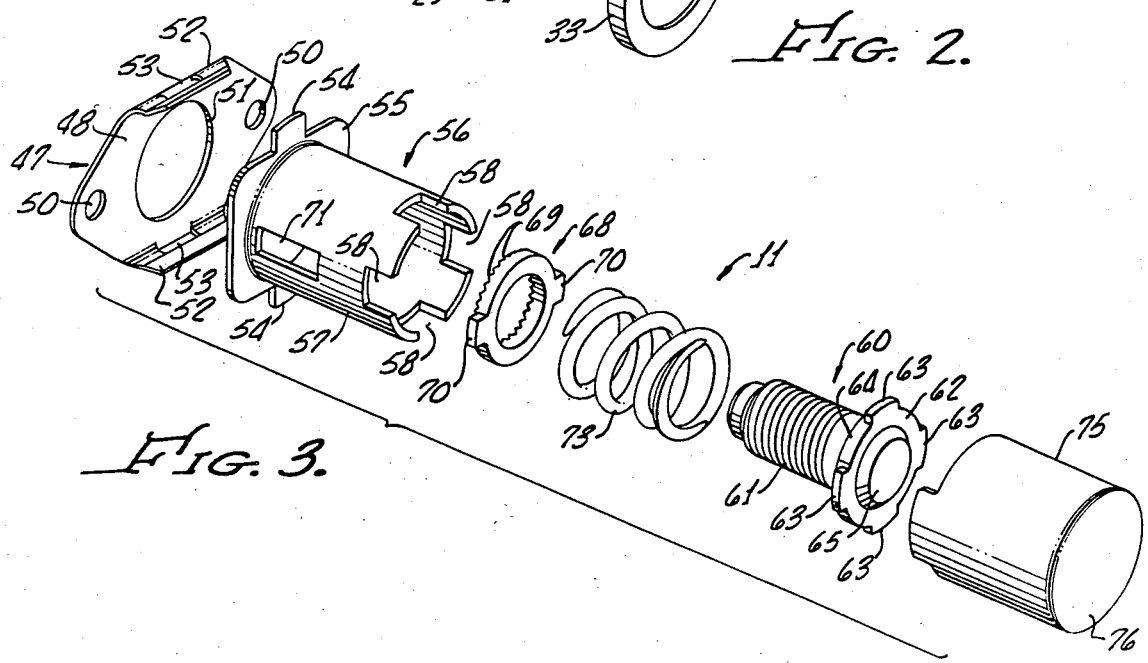
FIG. 3 is an exploded perspective view of the stud portion of the fastener.

The radially outer part of the ring 24 fits within a grommet 25 that is, in turn, secured to the workpiece 12. The grommet 25 is of sheet metal, made up of two pieces 26 and 27. The piece 26 has a part 28 which originally, as the fastener is manufactured, is of straight cylindrical configuration, as seen in FIG. 2. From one end of the cylindrical part 28 is a radially outwardly extending base 29, from the outer edge of which is an axial jog 30 that connects to a radial peripheral rim 31. The other piece 27 of the grommet 25 is of thinner gauge material and includes a radial flat ring 32 from the outer edge of which extends a cylindrical part 33 which is bent over the rim 31 to form a flange 34 that holds the pieces 26 and 27 together. The result is an annular groove between the base 29 of the part 26 and the flat ring 32 of the part 27, which receives the outer part of the retainer ring 24.

Figure 4:
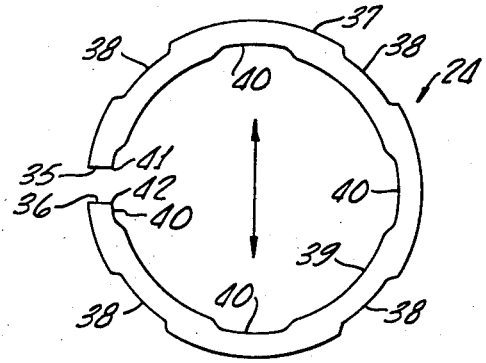
FIG. 4 is an enlarged plan view of the retention washer.

The retainer ring 24 also is of sheet metal, being a split circular element, best seen in the enlarged view of FIG. 4. The ring 24 is flat, having its principal surfaces in radial planes. The split in the ring provides adjacent ends 35 and 36 with a small gap between them. The grain of the material of the ring 24 is perpendicular to a diameter which bisects the gap between the ends 35 and 36, as indicated by the arrow. This is important in enabling the ring 24 to expand with relatively little distortion.

The outer circumferential edge 37 of the ring 24 is provided with four shallow, circumferentially elongated recesses 38, spaced equally around the periphery. The inside circumferential edge 39 of the retainer ring 24 includes circumferentially extending recesses 40 which are located intermediate the recesses 38. One of the recesses 40 is at the location of the ends 35 and 36, which means that the inner corners 41 and 42 of the ends 35 and 36 are radially outwardly of the inner edge 39 of the ring. The combination of the outer recesses 38 and inner recesses 40 gives the ring 24 an undulant shape, as viewed in plan. The result is a large effective width from the outer edge 37 to the inner edge 39, yet the actual width at the recesses 38 and 40 is much less. The greater effective width improves the retention of the ring in the grommet, while the smaller actual width means that the spring force is not excessive.

The nut assembly 10 is attached to the member 12 by inserting the grommet 25 into an opening 43 in the member 12, bringing the base 29 of the grommet into engagement with the surface 44 of the workpiece at one end of the opening. The outer end of the cylindrical part 28 of the grommet then is flared outwardly to form a flange 45 overlying the frustoconical end portion 46 of the opening in the member 12. The flange 46 and the base 29 then serve to hold the grommet to the member 12.

When the nut 14 is inserted into the grommet 25, the retainer ring 24 resiliently bears against the nut 14 and holds the nut to the grommet while permitting limited axial movement of the nut. In the released position of the fastener shown in FIG. 5, the nut 14 cannot be withdrawn from the grommet beyond a point where the inner edge 39 of the retainer ring 24 is received within the groove 20 of the nut, preventing the nut from being removed from the opening 43. The radial end wall 22 of the groove will react against the flat surface of the retainer ring 24 to provide a stop that prevents withdrawal of the nut from the grommet so that the nut is held to the workpiece. When the nut is advanced axially in securing the fastener, the retainer ring rides out of the groove 20 along the tapered inner groove wall 23 to slide along the cylindrical outer surface 21 of the nut as the nut is tightened. In the secured position of FIG. 7, the head 16 of the nut, which cannot pass through the grommet 25, bears against the flange 45 of the grommet.

The retainer ring 24 expands with very little distortion by virtue of its construction. The fact that the ends 35 and 36 are spaced outwardly away from the periphery of the nut means that expansion of the ring 24 is accomplished without engaging the end corners 41 and 42. The recesses 40 and the inner edge 39 of the retainer ring cause the ring to have reduced area contact with the periphery of the nut, which minimizes frictional resistance and wear on the surface of the nut. The combination of the inner and outer edge recesses, together with the orientation of the grain structure of the ring, allow the ring to be made to a relatively great effective width and to an increased thickness without resulting in a higher spring force than in conventional designs. The ring is securely held within the grommet 25 and possesses adequate strength to hold the nut securely.

The stud assembly 11 is held to the workpiece 13 by a cage 47 which has a bottom plate 48 attached to the workpiece 13 by rivets 49 that fit through openings 50. Between the rivets there is an enlarged opening 51 through the bottom plate 48. Two short side flanges 52 extend upwardly from the bottom plate 48 intermediate the rivet openings 50 and are provided with slots 53 that receive tabs 54 that project from the flat base 55 of a housing 56. This holds the housing 56 to the cage 47 and prevents the housing from rotating. The tabs 54 are not as large as the slots 53 and the housing 56 is not as wide as the spacing between the flanges 52 so that the housing is permitted limited floating movement relative to the cage 47 and hence relative to the workpiece 13. The cage 48 is of resilient material so that the side flanges can be deflected. This allows the housing 56 to be removed easily for replacement, which is advantageous in maintaining the fastener in the event of wear or damage to the components of the stud assembly.

The housing also includes a tubular portion 57 extending from the base 55 to an outer end provided with four notches 58 having flat inner edges that fall in a radial plane. The stud 60 of the assembly 11, which is received in the tubular portion 57, includes a threaded shank 61 and a head 62 that has four short, radially outwardly extending lugs 63 around its circular periphery 64. At the center of the outer end of the head is a short axially projecting portion 65. The lugs 63 of the stud 60 fit complementarily in the notches 58 in the end of the tubular part 57 of the housing, with the circumferential edge 64 of the head 62 engaging the inner wall of the housing. The stud 60 is secured to the housing 56 by bending the end of the tubular part 57 of the housing over the outer surface of the head 62. Thus, the portions of the housing end intermediate the notches 58 are bent over to form four retention flanges 66. This holds the stud against rotation relative to the housing 56, with its threaded shank 61 extending to the open end of the housing at the base 55.

Also within the housing 56 is a ratchet washer 68 which circumscribes the shank 61 of the stud 60. The end of the ratchet washer 68 facing the open end of the housing 56 is provided with radial teeth 69, comparable in size and number to the teeth 19 on the end of the nut 14. Two tabs 70 project radially outwardly at diametrically opposite locations from the periphery of the ratchet washer 68, and are received in two diametrically opposite axial slots 71 in the wall of the tubular portion 57 of the housing 56. This holds the ratchet washer 68 against rotation relative to the housing 56 while permitting the ratchet washer limited axial movement relative to the housing.

A compression spring 73 bears against the undersurface of the head 62 of the stud at one end, and against the inner radial surface of the ratchet washer 68 at its other end. Consequently, the spring 73 biases the ratchet washer toward the open end of the housing 56.

A sheet metal tubular cap 75, having a radial end wall 76 at one end, fits over the housing 56 to complete the stud assembly. This closes off the housing and protects its internal components. The cap 75 fits complementarily over the housing 56 and is held in position by forming a dimple 77 that extends into the inner end of one of the axial slots 71 in the tubular portion 57 of the housing. Thus, the connection of the cap to the housing is effected very rapidly and easily.

In use of the fastener, when the parts are mated the nut 14 is threaded onto the shank of the stud 61, passing through the opening 78 in the workpiece 13. As this occurs, the teeth 19 on the end of the nut slide over the teeth 69 on the ratchet washer 68. The force of the compression spring 73 is overcome as the nut is advanced and the ratchet washer 68 becomes pushed inwardly. When the fastener is fully tightened to the position of FIG. 7, the compression spring 73 maintains the ratchet washer pressed against the end of the nut 14 so that the teeth 19 and 69 remain in interengagement. This prevents loosening of the fastener under vibration as the nut cannot rotate relative to the ratchet washer 58 and the ratchet washer is held against rotation by the housing 56 which, through the cage 47, is attached to the workpiece 13. Only the application of a wrenching force can cause the loosening of the fastener.

The foregoing detailed description is to be clearly understood as given by way of illustration and example only, the spirit and scope of this invention being limited solely by the appended claims.

I claim:

1. In combination with a nut having a head at one end and an elongated cylindrical portion extending therefrom, said cylindrical portion having an outer end, and an annular groove adjacent said outer end, the end of said groove adjacent said head being outwardly flaring toward said head, the opposite end of said groove defining an abutment shoulder, a retaining device for preventing separation of said nut from a workpiece comprising a grommet having an inner diameter greater than that of said cylindrical portion and less than the outer diameter of said head, said grommet defining an annular recess, and a resilient washer received in said annular recess, said washer being of split annular construction so as to have spaced ends, and being inwardly biased so as to bear against said cylindrical portion of said nut, whereby said washer is adapted to enter said groove and engage said opposite end thereof for preventing separation of said nut from a workpiece, and said washer can be forced out of said groove by engagement with said end of said groove adjacent said head, said washer being of sheet metal with its principal surfaces in radial planes, the grain of said metal being substantially perpendicular to a diameter of said washer which bisects the space between said ends of said washer.

2. A device as recited in claim 1 in which said washer has spaced circumferentially elongated recesses in the outer edge thereof, and spaced circumferentially elongated recesses in the inner edge thereof intermediate said recesses in said outer edge thereof.

3. A device as recited in claim 2 in which there are four of said recesses in said outer edge, and four of said recesses in said inner edge.

4. A device as recited in claim 2 in which said ends of said washer are at the location of one of said recesses in said inner edge thereof, whereby said ends are spaced radially outwardly from said inner edge of said washer and are spaced from the surface of said nut.

5. A device as recited in claim 1 in which said grommet is made of two pieces of sheet metal, one of said pieces including a generally radially extending portion including a radial part extending outwardly from said tubular portion, an intermediate axial jog, and a second radial part extending from said axial jog, and a generally cylindrical tubular portion, the other of said pieces being bent over said second part of said generally radially extending portion for providing said annular recess, said tubular portion being outwardly deflectable for forming a flange for cooperating with said generally radially extending portion in holding said grommet to a workpiece.

* * * * *